United States Patent [19]

Testore

[11] 3,860,082
[45] Jan. 14, 1975

[54] TRANSMISSION SYSTEM FOR DRIVING WHEELS OF HEAVY MOTOR VEHICLES

[76] Inventor: Guido Testore, Piazzo Ormig, Ovada, Italy

[22] Filed: Apr. 2, 1973

[21] Appl. No.: 346,796

[30] Foreign Application Priority Data
Apr. 12, 1972 Italy .................................. 7223/72

[52] U.S. Cl. ............................................. 180/24.11
[51] Int. Cl. ...................... B62d 61/10, B60k 17/36
[58] Field of Search ..... 180/22, 24.05, 24.08, 24.11

[56] References Cited
UNITED STATES PATENTS

| | | | |
|---|---|---|---|
| 1,921,660 | 8/1933 | Church | 180/24.05 |
| 1,975,794 | 10/1934 | Knox | 180/24.05 X |
| 2,728,463 | 12/1955 | Beckwith | 180/24.11 X |
| 3,349,863 | 10/1967 | Wagner | 180/24.08 |
| 3,454,109 | 7/1969 | Roberts | 180/24.05 X |

*Primary Examiner*—David Schonberg
*Assistant Examiner*—Terrance L. Siemens
*Attorney, Agent, or Firm*—Wenderoth, Lind & Ponack

[57] ABSTRACT

A transmission system for driving wheels of heavy motor vehicles, comprising two rigid boxes freely swinging about a vehicle transverse, horizontal axis. Each box supports on both sides of the axis two sets of driving wheels that are powered by differential units housed within one of the boxes, each wheel set of such one box being connected with a correspondingly aligned wheel set of the other box through power transmission means comprising cardan joints or the like.

6 Claims, 1 Drawing Figure

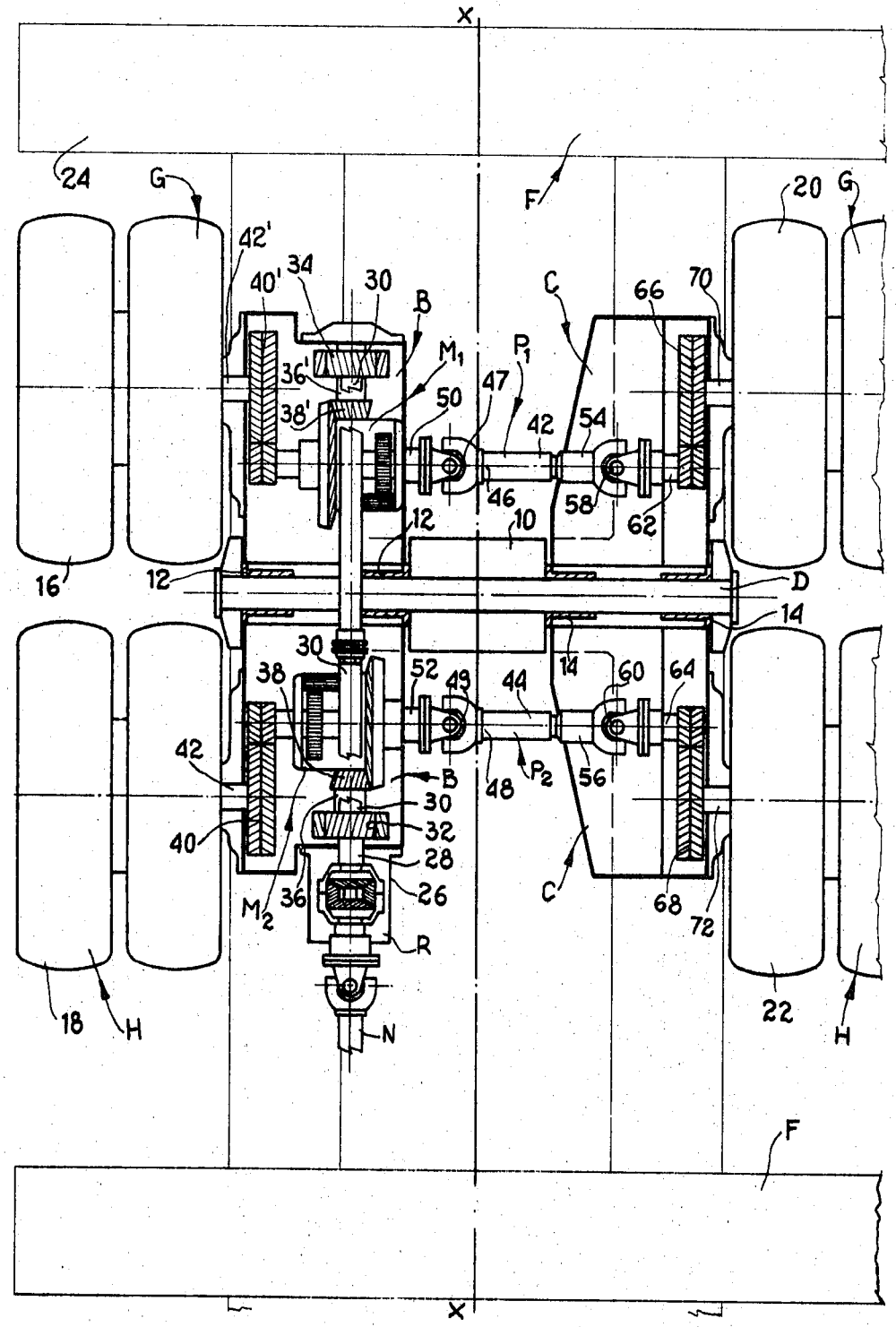

TRANSMISSION SYSTEM FOR DRIVING WHEELS OF HEAVY MOTOR VEHICLES

BACKGROUND OF THE INVENTION

This invention relates to a transmission system for driving wheels of heavy motor vehicles.

As well known, heavy motor vehicles, as e.g. crane trucks and the like, comprise two trains of driving wheels, that lie in mutually parallel relationship and each of which is driven by a related differential unit, the two differential units being located co-axially with the motor vehicle centerline and independent from each other.

The structure of these already known transmission means, as comprising two co-axially fitted differential units, entails different drawbacks during the operation of motor vehicle, one of such drawbacks being due to the large wear of vehicle silent-blocs, that take-up the shocks occurring in the motor vehicle operation. Usually, such silent-blocs are made unserviceable after a short time period and thus the worn-out silent-blocs must be frequently replaced with new ones. Another drawback due to such structure involves the not always satisfactory adhesion of the vehicle driving wheels on rough and uneven ground, or when unbalanced obstacles are to be overcome by the wheels.

SUMMARY OF THE INVENTION

The object of this invention is to overcome the above and further drawbacks and to such a purpose it consists of a transmission system for driving wheels of heavy motor vehicles, as e.g. crane trucks, excavators and the like, characterized in that it comprises two oppositely located rigid boxes, swingingly fitted, independently from each other, on a common axis that is secured to the vehicle frame and extends perpendicularly to the vehicle vertical center plane, each of the boxes supporting the driving wheels of the wheel trains of a corresponding vehicle side, while suitable differential units are fitted in one of the swinging boxes and driven by a single driving shaft that extends perpendicularly to the box swinging axis, in order to drive the driving wheels, the wheels that are supported by the box opposite such one box being driven through suitable cardan joint transmissions or the like. Accordingly, each mechanical unit, consisting of a swinging box and the associated driving wheels, is freely mounted to swing, within given limits, about the box axis, independently from the other mechanical unit and as an equalizing rocker arm, in order to suitably follow any ground roughness and unevenness and ensure a satisfactory vehicle running trim.

The above defined features of this invention can be carried-out in many, different forms, from the viewpoints of the system component arrangement, shape and sizes, of the number of driving wheels supported by each swinging box, of the connection of the swinging axis with the vehicle frame, of the structure and composition of the drive transmissions to the driving wheels, as well as of the use of the transmission system for vehicles of different types, wherein the transmission system may advantageously operate.

The rigid box swinging occurs in planes parallel with each other and to a plane vertically extending through the vehicle longitudinal middleline.

According to this invention, the driving wheels of each wheel train that are oppositely located on each vehicle side are connected with each other through the two parallel swinging boxes, by means of a kinematic chain comprising: a first gear associated with a first axle shaft supported by a first box, and to which first driving wheels of a considered wheel train are keyed; a related differential unit housed within a portion of the first box; a telescopic shaft trasmission with cardan joints, extending from the differential unit to second driving wheels of the same wheel train, as well as a second gear associated with a second axle shaft supported by a second swinging box, opposite to the former one, the second axle shaft being aligned with the first axle shaft.

The differential units are advantageously powered through a power distributor that is secured to the differential unit housing box.

BRIEF DESCRIPTION OF THE DRAWING

The single FIGURE is a partially sectioned plan view, with parts broken away, of a transmission system according to this invention.

DETAILED DESCRIPTION OF A PREFERRED EMBODIMENT OF THE INVENTION

A power transmission system for the driving wheels of a heavy motor vehicle, as shown in the drawing, comprises a pair of rigid boxes or casings B,C, that are oppositely located independently from each other and swingingly fitted on a common axis D, that is secured to a vehicle frame F in any suitable manner, e.g. by means of a fastening block 10. Boxes B,C are free to swing about bearings 12 and 14, respectively. Each of the swinging boxes B,C supports the driving wheels, on one vehicle side, appertaining to two wheel trains G,H. Thus, box B supports the twin wheel 16 of wheel train G and the twin wheel 18 of wheel train H, on the vehicle right side, while box C supports the twin wheel 20 of wheel train G and the twin wheel 22 of wheel train H, on the vehicle left side.

Axis D is perpendicular to a vertical plane extending through the vehicle longitudinal middleline X—X.

The driving wheels 16–20 of rear wheel train G and the driving wheels 18–22 of fore wheel train H (assuming that the driver's cab, not shown, is positioned in a fore frame end opposite to rear frame end 24) are powered through suitable differential units M1, M2, that are housed in swinging box B, on the vehicle right side, as will be explained in more detail below.

The power is applied to differential units M1,M2 by means of a drive shaft N, that is parallel to the vehicle middleline X—X and perpendicular to axis D, a power distributor R, having a casing 26 fastened to the fore end of swinging box B, being interposed between the corresponding end of drive shaft N and the differential units M1,M2. The power is then applied to driving wheels 20–22, supported by box C, through suitable cardan joint transmissions P2,P1.

As it can be appreciated from the drawing, a shaft 28 of power distributor R (that is well known in the art and designed to suitably distribute and balance the power on both driving wheel trains, according to changes and resistance encountered by the driving wheels while the vehicle is running) enters into the fore portion of box B, and forms a transmission shaft 30 perpendicular to axis D, and adapted to transmit the rotary motion of shaft N both to fore differential unit M2 and to rear differential unit M1. A gear wheel 32 is keyed to the fore end of transmission shaft 30, while another gear wheel 34 is keyed to the rear end of the same shaft. Gear wheel 32 is in mesh with a corresponding gear wheel (not shown) keyed to a countershaft 36, that drives a pinion 38 and then differential unit M2, wherefrom the drive is transmitted to an axle shaft 42 of twin driving wheel 18, through a gear 40.

Similarly, the rotary drive is transmitted from shaft 30 to a countershaft 36' of differential unit M1, and then to a pinion 38' that drives a gear 40' and finally an axle shaft 42, whereon the twin driving wheel 16 is fitted.

From differential units M1,M2 the power is transmitted to driving wheels 20,22 on the vehicle left side through intermediate shafts P1 and P2. More detailedly, each intermediate shaft consists of a telescopic shaft 42 and respectively 44, having a right end 46 and 48, respectively, that is connected by a cardan joint 47 and 49 to a countershaft 50 and 52 of differentials unit M1 and M2, respectively. The opposite end 54 and 56, respectively, of each telescopic shaft 42 and 44 is connected by a cardan joint 58 and 60, to a spindle 62 and 64 that drives a gear wheel 66 and 68 (corresponding to gear wheels; 40' and 40) fastened to an axle shaft 70 and 72 carrying the rear driving wheels 20 and respectively the fore driving wheels 22.

Thus, as can be readily appreciated, a kinematic chain connecting fore driving wheels 18 and 22 with each other consists of gear 40, that is associated with axle shaft 42 extending from box B and supporting driving wheels 18, of differential unit M2, within box B, of an intermediate telescopic shaft 44, and of a second gear 68, that is associated with axle shaft 72 extending from swinging box C and supporting driving wheels 22, axle shaft 72 being obviously parallel to the axle shaft 42.

An equivalent kinematic chain connects the rear driving wheels 16-20.

In the operation of the shown device, the rotation of drive shaft N is transmitted, through power distributor R, to differential units M2,M1 by means of shaft 30, and then to driving wheels 18-22 of fore train H and driving wheels 16,20 of rear train G, through the above described kinematic chains. The motor vehicle is then moved in a forward or rearward direction, according to the direction of rotation of shaft N.

Due to the structure of the swinging box system B,C, the driving wheels 16,18, that are supported by axle shafts 42,42' of box B, are free to swing in a vertical plane, parallel to plane X—X, independently from wheels 20,22. The mechanical assembly formed by the swinging box B and wheels 16-18 is practically free to rotate, within given limits, about the axis D, whereon box B is pivotally fitted by means of bearings 12 (that allow the box to swing about the axis D, but positively prevent any axial shifting thereof), independently from a swinging motion of the opposite mechanical assembly, formed by box C and driving wheels 20-22, that is in turn pivotally fitted on the same axis D through bearings 14, which allow the box to swing about its axis and prevent any axial shifting thereof.

Thus, the independent swinging motion of the two rigid boxes B,C allows the driving wheels on one vehicle side to follow any ground unevennesses, independently from the driving wheels on the opposite vehicle side, whereby a satisfactory running is ensured, the rigid boxes B,C acting as equalizing rocker arms swinging about axis D. Also the vehicle trim and stability in a direction transverse to plane X—X are furthered by transmission system, due to the possible independent swinging motion of driving wheels on either vehicle side.

The traction of driving wheels on uneven ground is wholly ensured by the system according to this invention. Moreover the system, due to its structure as formed by swinging rigid boxes, is very compact and rugged, as well as able to stand-up against unusually severe stresses. The rigid connection of the transmission system to the vehicle frame makes it possible to wholly avoid shock-absorbing silent-blocs, and the drawbacks thereof.

While a specific embodiment of this invention has been herein shown and described, it is to be understood that various changes and modifications may be made thereon, without departing from the spirit and scope of this invention.

I claim:

1. A transmission system for driving wheels of heavy motor vehicles, as e.g. crane trucks, excavators and the like, comprising a pair of oppositely located rigid boxes swingingly fitted, independently from each other, on a common axis secured to vehicle frame and extending perpendicularly to a vehicle longitudinal vertical middle plane, each of said boxes supporting the driving wheels of two wheel trains, on a corresponding vehicle side, said wheels being powered by suitable differential units, that are housed in one of said swinging boxes and driven by a single shaft perpendicular to said box swinging axis, said differential units driving the wheels supported by the box opposite to said one box through suitable cardan joint transmissions or the like, in order to form two mechanical assemblies, each consisting of a swinging box and driving wheels supported therein, that are independently free to swing, within given limits, about said common axis.

2. A transmission system according to claim 1, wherein the opposite driving wheels of each wheel train are connected with each other, through said two parallel and opposite swinging boxes, by a kinematic chain comprising a first gear acting on an axle shaft that is supported by said one box and supports the train driving wheels on the vehicle side of said one box, a related differential unit housed in a corresponding portion of said one box, a telescopic shaft transmission with cardan joints between said differential unit and a second gear acting on a second axle shaft that is supported by said opposite box and supports the train driving wheels on the other vehicle side, said second axle shaft being aligned with said first axle shaft.

3. A transmission system according to claim 1, wherein said boxes are mounted for swinging movement in planes parallel with each other and parallel to said vehicle longitudinal vertical middle plane.

4. A transmission system according to claim 1, wherein said differential units are powered through a power distributor that is secured to said one box.

5. A transmission system according to claim 1, wherein said rigid boxes are swingingly fitted on said common axis by means of bearings that allow for a box rotary motion about said axis and positively prevent any box axial shifting motion.

6. A transmission system according to claim 4, wherein said power distributor controls said differential units by means of gear wheels that are keyed at both ends of a shaft and are in mesh with mating gear wheels, in turn keyed to pinion-bearing spindles adapted to drive said two differential units.

* * * * *